(12) United States Patent
Schaefer

(10) Patent No.: US 12,742,654 B2
(45) Date of Patent: Sep. 22, 2026

(54) VERTICAL ORDER DETERMINATION FOR OVERLAPPING ROADWAYS

(71) Applicant: Toyota Jidosha Kabushiki Kaisha, Toyota (JP)

(72) Inventor: Alexander Christoph Schaefer, Fremont, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 87 days.

(21) Appl. No.: 18/809,762

(22) Filed: Aug. 20, 2024

(65) Prior Publication Data

US 2026/0056029 A1 Feb. 26, 2026

(51) Int. Cl.
*G01C 21/00* (2006.01)
*G01C 21/32* (2006.01)

(52) U.S. Cl.
CPC ......... *G01C 21/3815* (2020.08); *G01C 21/32* (2013.01); *G01C 21/3841* (2020.08); *G01C 21/3867* (2020.08)

(58) Field of Classification Search
CPC ........................ G01C 21/3815; G01C 21/3867
USPC .......................................................... 701/450
See application file for complete search history.

(56) References Cited

U.S. PATENT DOCUMENTS

| | | | | |
|---|---|---|---|---|
| 9,396,563 | B2 | 7/2016 | Arikan et al. | |
| 10,234,568 | B2 | 3/2019 | Croyle | |
| 11,468,765 | B2 | 10/2022 | Ivanov et al. | |
| 2008/0298891 | A1* | 12/2008 | Boucherat | G06F 30/13 404/1 |
| 2018/0209796 | A1* | 7/2018 | Kudrynski | G01C 21/30 |
| 2019/0376795 | A1* | 12/2019 | Linder | H04W 4/40 |
| 2025/0027787 | A1* | 1/2025 | Xiao | G01C 21/3822 |
| 2025/0297866 | A1* | 9/2025 | Jeong | G01C 21/3878 |

* cited by examiner

*Primary Examiner* — Samantha (Yuehan) Wang
(74) *Attorney, Agent, or Firm* — Christopher G. Darrow; Darrow Mustafa PC

(57) ABSTRACT

Systems, methods, and other embodiments described herein relate to determining a vertical order of overlapping road segments. In one embodiment, a method includes generating connections between centroids based on at least an elevation difference, proximity, and forming a non-self-overlapping polygon. The centroids are vehicle positions along one or more roads. The non-self-overlapping polygon has sides that match at least a portion of the one or more roads and do not overlap. The method includes determining a vertical order of the one or more roads based on at least the non-self-overlapping polygon and an indicator indicating an elevation of the non-self-overlapping polygon.

20 Claims, 15 Drawing Sheets

FIG. 6

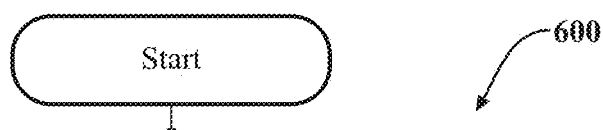

Generating a layer graph, the layer graph including drivability graph edges that have not been marked as processed and separation graph edges
610

Determining a drivability graph edge with the lowest absolute gradient of all drivability graph edges that have not been marked as processed
620

Determining whether to keep the drivability graph edge in the layer graph based on whether the drivability graph edge creates a cycle in the layer graph that involves separation graph edges
630

Marking the drivability graph edge as processed
640

Determining whether there are any remaining drivability graph edges that have not been marked as processed?
650

Yes

No

Determining the vertical ordering of layers in the layer graph based on the cycles and separation graph edges within the layer graph
660

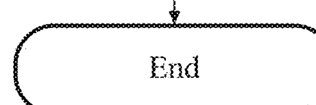

VERTICAL ORDER DETERMINATION FOR OVERLAPPING ROADWAYS

TECHNICAL FIELD

The subject matter described herein relates, in general, to systems and methods for generating and processing digital road maps.

BACKGROUND

Processing sensor data relating to overlapping roads or stacked roads disclosed in a 2D mapping format can be complex due to ambiguity and the difficulty associated with discerning which of the overlapping roads or stacked roads the sensor data is related to. Navigation can be challenging when it is difficult to determine on which level in a set of stacked roads a vehicle is situated.

SUMMARY

In one embodiment, a system for determining a vertical order of overlapping roadways in a road map is disclosed. The system includes a processor and a memory in communication with the processor. The memory stores machine-readable instructions that, when executed by the processor, cause the processor to generate connections between centroids based on at least an elevation difference, proximity, and forming a non-self-overlapping polygon. The centroids are vehicle positions along one or more roads. The non-self-overlapping polygon has sides that match at least a portion of the one or more roads and do not overlap. The machine-readable instructions further include machine-readable instructions that, when executed by the processor, cause the processor to determine a vertical order of the one or more roads based on at least the non-self-overlapping polygon and an indicator indicating an elevation of the non-self-overlapping polygon.

In another embodiment, a method for determining a vertical order of overlapping roadways in a road map is disclosed. The method includes generating connections between centroids based on at least an elevation difference, proximity, and forming a non-self-overlapping polygon. The centroids are vehicle positions along one or more roads. The non-self-overlapping polygon has sides that match at least a portion of the one or more roads and do not overlap. The method includes determining a vertical order of the one or more roads based on at least the non-self-overlapping polygon and an indicator indicating an elevation of the non-self-overlapping polygon.

In another embodiment, a non-transitory computer-readable medium for determining a vertical order of overlapping roadways in a road map is disclosed. The non-transitory computer-readable medium includes instructions that, when executed by a processor, cause the processor to perform one or more functions. The instructions include instructions to generate connections between centroids based on at least an elevation difference, proximity, and forming a non-self-overlapping polygon. The centroids are vehicle positions along one or more roads. The non-self-overlapping polygon has sides that match at least a portion of the one or more roads and do not overlap. The instructions include instructions to determine a vertical order of the one or more roads based on at least the non-self-overlapping polygon and an indicator indicating an elevation of the non-self-overlapping polygon.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6 is another flowchart illustrating one embodiment of a method associated with determining a vertical order of overlapping roadways.

DETAILED DESCRIPTION

Figure 1A:
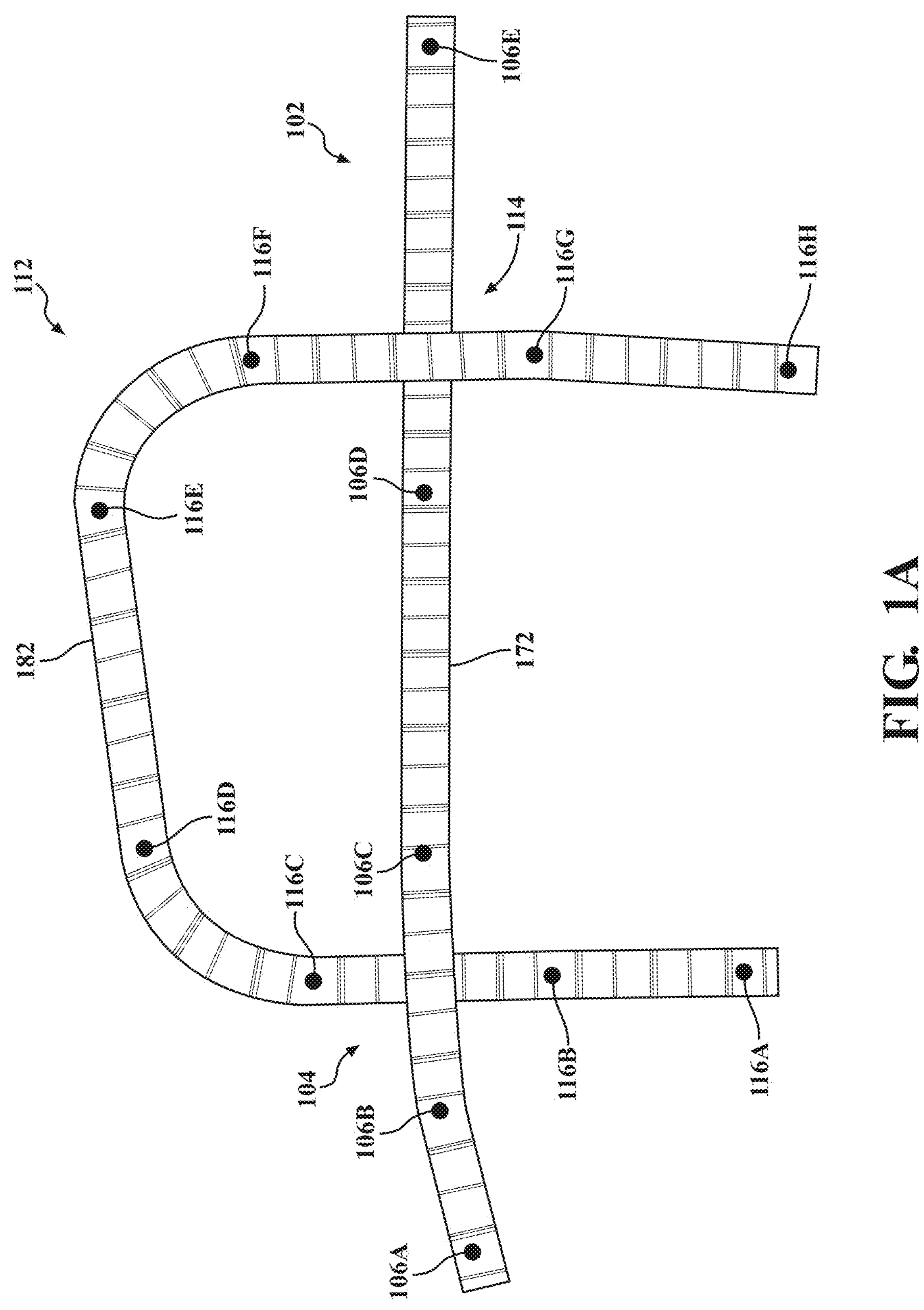
FIGS. 1A-1D illustrate an example of determining a vertical order of overlapping roadways.

Systems, methods, and other embodiments associated with systems and methods for determining the vertical order of overlapping roadways are disclosed. Many regions include two or more roads where one or more roads are elevated above other roads. These are also known as stacked roads. In some instances, it may be difficult to inspect and/or process 2-dimensional maps of stacked roadways when there are no means of slicing and/or ordering the stacked roadways vertically. It may also be challenging to determine which road amongst the stacked or overlapping roads or roadways a vehicle is travelling on. It can make it difficult for navigation or for processing sensor data associated with one of the stacked roads. In some cases, the order of stacked roads may change. As an example, a first road and a second road. The first road may have a first road segment and a second road segment such that the first road segment extends into the second road segment. The second road may have a third road segment and a fourth road segment such that the third road segment extends into the fourth road segment. In such an example, the first road segment may be above the third road segment and the second road segment may be below the fourth road segment. As such, the systems and methods within this application disclose partitioning the drivable surface into non-self-overlapping 2D polygons (called road segments) and assigning a vertical order to the overlapping segments based on elevation levels so as to distinguish between the road segments at different levels of an overlap or a stack of roads. In other words, the systems and methods disclosed order the 2D polygons (or road segments) vertically. The systems and methods disclosed can further assist in associating sensor data for each of the stacked roads with a marker (or label) indicating the relationship between the sensor data, the road associated with the sensor data, and the other stacked roads.

Current methods do not include partitioning the drivable surface into non-self-overlapping polygons or generating an elevation relationship between roads within a set of stacked roads. As such, generating maps and providing navigation can be labor-intensive, time-consuming, expensive, and require extensive storage and computational resources.

Accordingly, systems, methods, and other embodiments associated with determining the vertical order of overlapping roadways are disclosed. The system may receive sensor data and/or a drivability graph of a given area. The system may generate the drivability graph based on the ingested sensor data. The sensor data may be vehicle sensor data originating from vehicles travelling along the roads in the given area. As an example, the vehicle sensor data may include nodes which refer to the position of the vehicles as the vehicles travel along the roads. The sensor data, also known as the input data, may include vehicle positions and associated detections, such as lane markings, curbs, and/or traffic lights. The vehicle sensors may capture sensor data relating to the road and/or the surroundings of the vehicle. As previously mentioned, the system receives sensor data from vehicle sensors (such as Toyota Safety Sense sensors) as vehicles travel along the road. The vehicle sensors such as Global Positioning Systems (GPS), inertial measurement unit (IMU), and accelerometers can include information about the location of the vehicle. Additionally, vehicle sensors that perceive an environment, such as cameras, LIDAR sensors, and radar sensors can include information about the surroundings of the vehicle, such as lane markings. Based on these data points, the system estimates a field of view for each vehicle position. The field of view of the vehicle sensors may be shaped as and referred to as a polygon. In other words, based on the detections, the system may generate a field of view, i.e., a polygon that approximates the drivable surface around a given vehicle position.

The system may form a drivability graph based on the polygon(s) associated with sensor data that originates from a single vehicle or sensor, and/or sensor data that shares common characteristics such as being at the same or similar elevation levels or sharing a similar perspective view of surrounding objects. The drivability graph is a graph that includes nodes that represent fields of view within a given region. As such, the system may generate the drivability graph showing the various roads within a region using nodes and edges connecting the nodes. The nodes are the field-of-view polygons. However, in order to plot the graph, each polygon may be represented by a point. As an example, the point may indicate the center of the polygons associated with the fields of view. Additionally and/or alternatively, the points may indicate the positions of the vehicles when the sensor data was being captured. The edges connect nodes that have a drivable path between the nodes. In other words, the edges represent drivable connections between overlapping fields of view. As an alternative, the system may receive a drivability graph generated by another entity or source.

The system partitions the roads into segments that do not self-overlap such that the road does not curve back onto itself. As an example, the system may generate the segments based on the sensor data and/or the polygons mentioned above. The polygons may be known as field-of-view polygons. The system may then determine the relationship between one or more segments that overlap another one or more segments. In other words, the system may determine the relationship between segments such as an elevation relationship, e.g., segments are at the same level, a first segment is above a second segment, a first segment is below a second segment. As another example, the relationship between segments may be based on a cohesiveness relationship which is based on whether the segments are along the same roadway or on different roadways. The system may then determine non-self-overlapping partitions of the roads based on the relationships such as the elevation relationship and the cohesiveness relationship. The system may then determine the vertical order of the non-self-overlapping partitions.

As another example, the system receives multiple centroids. The centroids are the vehicle positions along the road(s). The centroids originate from the sensor data. The centroids may contain global position system (GPS) coordinates as well as elevation information. Elevation information may refer to how high above sea level the centroid is at that position.

A self-overlapping partition of the road or more specifically, a direct self-overlapping partition of the road refers to a road that curves onto itself such as in cloverleaf intersections. An indirect self-overlapping partition of the road refers to a road that has a first portion that extends to a second portion. The first portion of the road is below a first portion of a second road and the second portion of the road is above a second portion of the second road. As such, the road and the second road are intertwined. In either case, the system keeps the last two unconnected centroids unconnected. The system then identifies the number of partitions of the road(s) and then orders the partitions based on the elevation levels of the associated centroids and edges for the partitions.

In summary, this method includes partitioning a drivable surface into layers such that the layers can be ordered vertically. In order for the layers to be able to be ordered vertically, two conditions are to be met. The first condition is the layers may not self-overlap. A self-overlapping layer wraps over itself such that a portion of the layer is vertically above another portion of the layer. would be on top of and below itself, such as a cloverleaf interchange. The second condition is layers may not be intertwined. In a case where two or more layers are intertwined, the vertical relationship between the layers is not maintained throughout the length of the layers. In other words, at one portion of the layers, one of the layers is above an other of the layers and at another portion of the one layer is below the other of the layers.

The method includes determining layers based on the two aforementioned conditions. The method further includes determining the layers based on a layer graph. A layer graph is based on a drivability graph and a separation graph. The drivability graph shows one or more paths that are drivable by a vehicle. The drivability graph may be an undirected graph. The paths may be illustrated or indicated by lines connecting centroids. The separation graph shows the relationship between centroids that belong to different paths and are overlapping. The separation graph is a directed graph. As such the separation graph includes arrows between two centroids, indicating the centroid that belongs to the path above and the centroid that belongs to the path below. More generally, the separation graph includes nodes which are field-of-view polygons as well as edges that connect nodes that overlap but have no direct connection in the drivability graph as there is no drivable path between them.

The layer graph includes centroids or nodes that are present in both the drivability graph and the separation graph. The layer graph also includes a subset of the edges that are present in the drivability graph. The connected components of the layer graph form the individual layers. A connected component in a graph is defined as the set of nodes that are reachable from each other. In other words, the layer graph is a drivability graph that has some edges removed such that the connected components form layers.

The method for growing the layer graph is iterative. In every iteration, the method includes the following steps: finding a drivability graph edge with the lowest absolute gradient of all drivability graph edges that have not yet been processed and generating a combined graph. The combined graph is a graph that includes the nodes of the drivability and separation graphs as well as the undirected edges of the current layer graph and the directed edges of the separation graph.

The method further includes checking whether adding the drivability graph edge with the lowest absolute gradient of all drivability graph edges that have not yet been processed to the combined graph creates a directed cycle in the combined graph that includes separation graph edges. In a case where the combined graph includes separation graph edges, the method includes determining not to add the drivability graph edge to the combined graph as that would create inconsistency.

It is worth noting that a cycle in the combined graph that includes separation graph edges is synonymous with inconsistent layers. As an example, travelling along a cycle that contains two separation graph edges may lead to travelling up from a first layer to a second layer, and travelling up from the second layer to a third layer and ending back at the first layer, which is a clear indication of the layers may include overlaps.

The method includes creating labels for horizontal slices of the map, where there are no overlaps between the horizontal slices. As an example, the method includes generating a directed graph of all layers. Each layer may be represented by a node and an overlap between layers may be represented by an edge. The edge is a directed edge that points from a lower layer to an upper layer. The method includes selecting a start node without a level label and without incident edges and marking the start node with the level label 0. The method then includes following all possible directed paths that start from the start node. If a current node on the path does not have a label yet, set the label to an increment value based on the number of nodes between the current node and the start node. For example, the first node after the start node would be assigned label 1, the next one 2, etc. If a current node on the path already has a level label which indicates there are multiple paths from the start node to the current node, update it the level label based on the path that has more intermediate nodes. The method includes repeating the steps from following all possible directed paths that start from the current node.

The method includes adding the drivability graph edge to the combined graph in the case where the paths are not intertwined and not adding the drivability graph edge to the combined graph where the paths are intertwined.

The method includes marking the drivability graph edge as processed and repeating the steps until all drivability graph edges are processed.

Upon processing all the drivability graph edges, the method includes utilizing the resulting layer graph to determine which node is associated with each layer. The method includes using the separation graph to determine the vertical ordering of the layers.

The embodiments disclosed herein present various advantages over conventional technologies that generate or utilize vertical order of overlapping or stacked roads. First, the embodiments can provide a more accurate prediction of the characteristics of multiple overlapping roads such as the vertical order of the multiple overlapping roads. Second, the embodiments are less resource-intensive than the prior art. Third, the embodiments simplify the process of generating a semantic map for the road.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIGS. 1A-1D illustrate another example of determining a vertical order of overlapping roads 102, 112. A straight road 102 and a curved road 112 overlap at two locations 104, 114. At a first location 104, the straight road 102 is above the curved road 112 and at a second location 114, the curved road 112 is above the straight road 102.

FIG. 1A shows two sets of centroids. A first set 172 of centroids 106A, 106B, 106C, 106D, 106E is associated with the straight road 102, and a second set 182 of centroids 116A, 116B, 116C, 116D, 116E, 116F, 116G, 116H is associated with the curved road 112. The vertical order determination system 100 may determine which road 102, 112 the centroids 106A, 106B, 106C, 106D, 106E, 116A, 116B, 116C, 116D, 116E, 116F, 116G, 116H are associated with. The vertical order determination system 100 may determine the elevation level of each centroid 106A, 106B, 106C, 106D, 106E, 116A, 116B, 116C, 116D, 116E, 116F, 116G, 116H then determine the difference in elevation levels between centroids 106A, 106B, 106C, 106D, 106E, 116A, 116B, 116C, 116D, 116E, 116F, 116G, 116H that are proximate to each other. The elevation level of the centroid may be included in the sensor data associated with the centroid 106A, 106B, 106C, 106D, 106E, 116A, 116B, 116C, 116D, 116E, 116F, 116G, 116H. The vertical order determination system 100 may determine whether the difference in elevation levels exceeds a threshold value such as fourteen (14) feet. In such an example, the difference in elevation levels between two centroids 106A, 106B, 106C, 106D, 106E, 116A, 116B, 116C, 116D, 116E, 116F, 116G, 116H may be fifteen (15) feet, the vertical order determination system 100 may then determine that the difference in elevation exceeds the threshold value and the two centroids 106A, 106B, 106C, 106D, 106E, 116A, 116B, 116C, 116D, 116E, 116F, 116G, 116H are not connected. As such, there is no direct drivable path between the two centroids 106A, 106B, 106C, 106D, 106E, 116A, 116B, 116C, 116D, 116E, 116F, 116G, 116H. In other words, a vehicle cannot travel along the shortest distance between the two centroids 106A, 106B, 106C, 106D, 106E, 116A, 116B, 116C, 116D, 116E, 116F, 116G, 116H. The vertical order determination system 100 may determine that the difference in elevation levels between two centroids 106A, 106B, 106C, 106D, 106E, 116A, 116B, 116C, 116D, 116E, 116F, 116G, 116H is two (2) feet, which is less than the threshold value. The vertical order determination system 100 may determine that there is a drivable path between the two centroids 106A, 106B, 106C, 106D, 106E, 116A, 116B, 116C, 116D, 116E, 116F, 116G, 116H. In other words, a vehicle may travel along a straight direct line from one of the two centroids 106A, 106B, 106C, 106D, 106E, 116A, 116B, 116C, 116D, 116E, 116F, 116G, 116H to the other of the two centroids 106A, 106B, 106C, 106D, 106E, 116A, 116B, 116C, 116D, 116E, 116F, 116G, 116H. The vertical order determination system 100 may then group the centroids 106A, 106B, 106C, 106D, 106E, 116A, 116B, 116C, 116D, 116E, 116F, 116G, 116H based on the elevation difference between neighboring centroids being less than the threshold value. As shown, the vertical order determination system 100 may determine the centroids 106A, 106B, 106C, 106D, 106E into a first set 172 and the centroids 116A, 116B, 116C, 116D, 116E, 116F, 116G, 116H into a second set 182 based on the difference in elevation levels between neighboring centroids 106A, 106B, 106C, 106D, 106E, 116A, 116B, 116C, 116D, 116E, 116F, 116G, 116H.

Figure 1B:
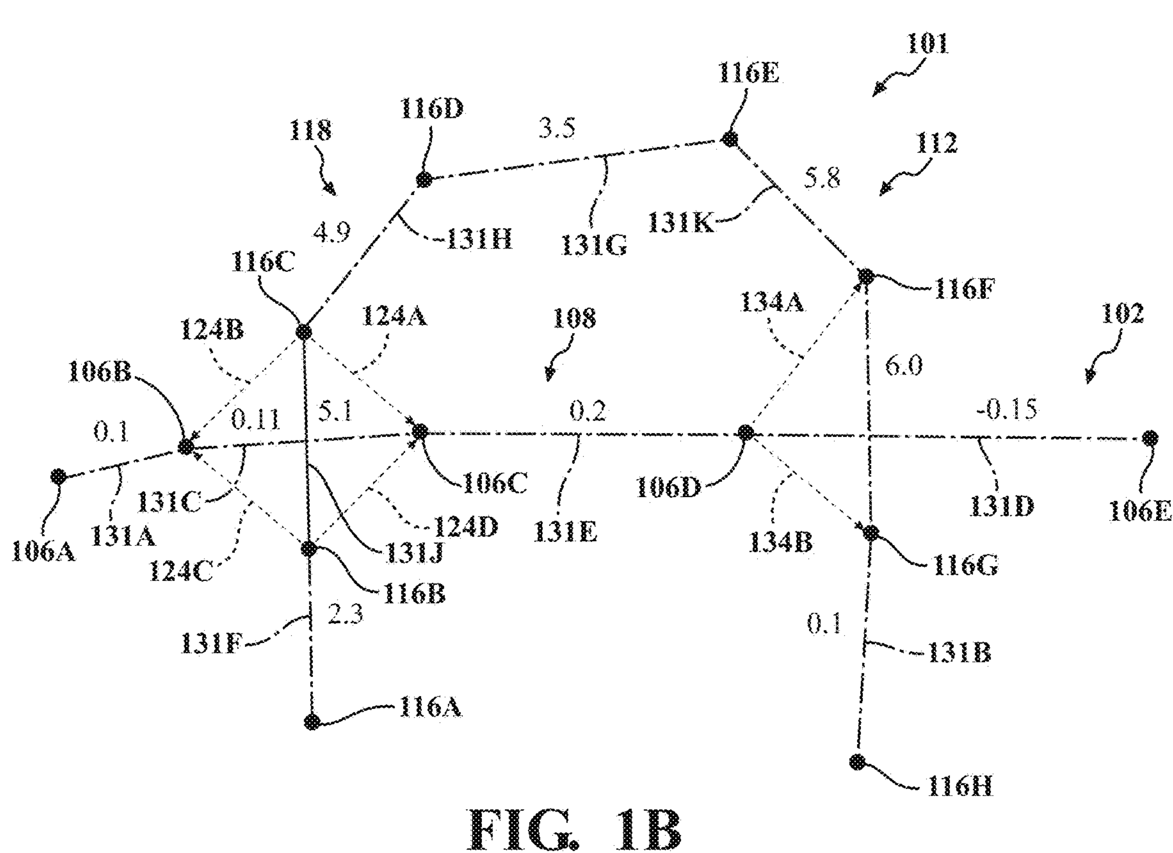

FIG. 1B shows a drivability graph 101 with gradient relationship values 108, 118 between neighboring centroids 106A, 106B, 106C, 106D, 106E, 116A, 116B, 116C, 116D, 116E, 116F, 116G, 116H, where the neighboring centroids are within the same set 172, 182 and associated with the same road 102, 112. A gradient relationship value 108, 118 between adjacent centroids is the slope between adjacent centroids based on the difference in elevation levels. As such, the drivability graph shows a gradient relationship (or slope) between each pair of adjacent centroids in the first set 172. The drivability graph also shows a gradient relationship (or slope) between each pair of adjacent centroids in the second set 182.

The vertical order determination system 100 may generates an indicator showing the relationship between centroids 106A, 106B, 106C, 106D, 106E, 116A, 116B, 116C, 116D, 116E, 116F, 116G, 116H that are proximate to each other but not in the same set or on the same road. As shown in FIG. 1B, the indicator may be arrows 124A, 124B, 124C, 124D, 134A, 134B. The arrows 124A, 124B, 124C, 124D, 134A, 134B originate from the centroids 106A, 106B, 106C, 106D, 106E, 116A, 116B, 116C, 116D, 116E, 116F, 116G, 116H with a lower elevation level and the arrows 124A, 124B, 124C, 124D, 134A, 134B end at the centroids 106A, 106B, 106C, 106D, 106E, 116A, 116B, 116C, 116D, 116E, 116F, 116G, 116H with a higher elevation level. As such, the arrows show which centroids 106A, 106B, 106C, 106D, 106E, 116A, 116B, 116C, 116D, 116E, 116F, 116G, 116H belong to the road below and which centroids 106A, 106B, 106C, 106D, 106E, 116A, 116B, 116C, 116D, 116E, 116F, 116G, 116H belong to the road above. As shown, the centroids 106B, 106C are above the centroids 116B, 116C based on the direction of the arrows 124A, 124B, 124C, 124D. Also as shown, the centroids 116F, 116G are above the centroid 106D based on the direction of the arrows 134A, 134B.

Figure 1C:
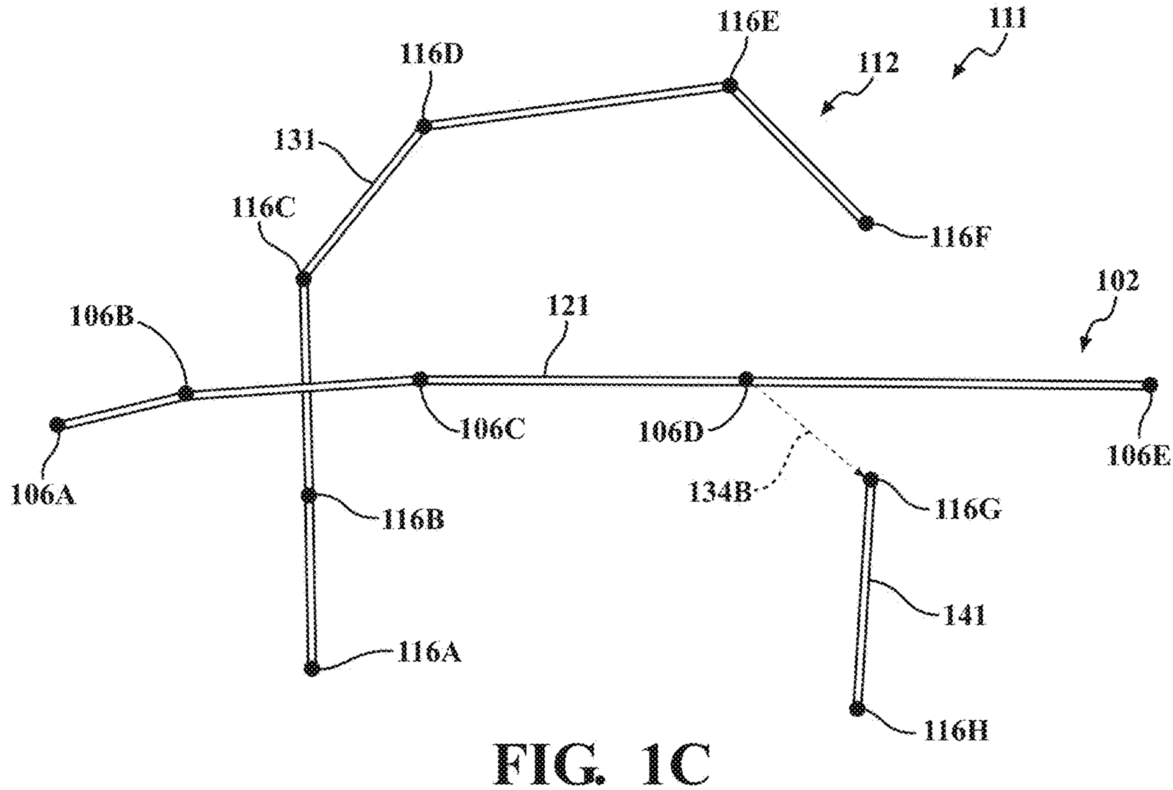

FIG. 1C shows a layer graph 111. The layer graph 111 includes non-self-overlapping polygons known as layers, which are based on the drivable surfaces. A self-overlapping polygon may include a road that extends such that one portion of the same road overlaps another portion of the same road. In this embodiment, the road directly overlaps onto itself. Another embodiment of a self-overlapping polygon may include a first road that extends such that one portion of the first road overlaps one portion of a second road and another portion of the second road overlaps another portion of the first road. In this embodiment, the road indirectly overlaps onto itself. As such, a non-self-overlapping polygon is a road that does not include one portion of the road overlapping another portion of the road, directly or indirectly.

The vertical order determination system 100 may connects neighboring centroids 106A, 106B, 106C, 106D, 106E, 116A, 116B, 116C, 116D, 116E, 116F, 116G, 116H based on one or more factors. The factors may include whether the centroids 106A, 106B, 106C, 106D, 106E, 116A, 116B, 116C, 116D, 116E, 116F, 116G, 116H belong to the same set 272, 282 and/or the same road 102, 112, the gradient relationship value between the centroids 106A, 106B, 106C, 106D, 106E, 116A, 116B, 116C, 116D, 116E, 116F, 116G, 116H, and/or whether connecting the two centroids would lead to two roads that already have a first elevation order at one location 104 having a second elevation order at a second location 114 that differs from the first elevation order. The centroids 106A, 106B, 106C, 106D, 106E, 116A, 116B, 116C, 116D, 116E, 116F, 116G, 116H may belong to the same set 172, 182 and/or same road 102, 112 as shown in FIG. 1A. The gradient relationship values 108, 118 are as shown in FIG. 1B.

As further shown in FIG. 1B, the two roads cross at two locations 104, 114. At the first location 104, the straight road 102 is higher than and overlaps the curved road 112, and at the second location 114, the curved road 112 is higher than and overlaps the straight road 102. The vertical order determination system 100 may determine a first elevation order between the overlapping roads at a first location, determining a second or more elevation orders between the roads overlapping at a second or more locations. In a case where the second or more elevation orders are the same as the first elevation order, the centroids 106A, 106B, 106C, 106D, 106E, 116A, 116B, 116C, 116D, 116E, 116F, 116G, 116H between the first location 104 and the second location 114 may be connected to the neighboring centroids 106A, 106B, 106C, 106D, 106E, 116A, 116B, 116C, 116D, 116E, 116F, 116G, 116H. In a case where the second or more elevation orders are different from the first elevation order, the vertical order determination system 100 may maintain a break or a separation between a portion of one or more roads 112 at the first location 104 and a portion of the one or more roads 112 at the second location 114 so as to maintain non-self-overlapping polygons.

As an example, the vertical order determination system 100 may connect the centroids 106A, 106B, 106C, 106D, 106E, 116A, 116B, 116C, 116D, 116E, 116F, 116G, 116H by starting with the two centroids that have the lowest gradient relationship value. As such and as shown in FIG. 1B, the two centroids 106A, 106B have the lowest gradient relationship value 0.1. The vertical order determination system 100 may connect the centroids in the following order based on the gradient relationship values, the two centroids 106A, 106B which have a gradient relationship value of 0.1 with a drivability graph edge 131A, the two centroids 116G, 116H, which also have a gradient relationship value of 0.1 with a drivability graph edge 131B, the two centroids 106B, 106C, which have a gradient relationship value of 0.11 with a drivability graph edge 131C, the two centroids 106D, 106E, which have a gradient relationship value of −0.15 with a drivability graph edge 131D, the two centroids 106C, 106D, which have a gradient relationship value of 0.2 with a drivability graph edge 131E, the two centroids, 116A, 116B, which have a gradient relationship value of 2.3 with a drivability graph edge 131F, the two centroids 116D, 116E, which have a gradient relationship value of 3.5 with a drivability graph edge 131G, the two centroids 116C, 116D, which have a gradient relationship value of 4.9 with a drivability graph edge 131H, the two centroids 116B, 116C, which have a gradient relationship value of 5.1 with a drivability graph edge 131J, and the two centroids 116E, 116F, which have a gradient relationship of 5.8 with a drivability graph edge 131K.

The two centroids 116F, 116G that have a gradient relationship value of 6.0. The vertical order determination system 100 may determine that connecting the two centroids 116F, 116G would result in a self-overlapping polygon and so, the method includes keeping the two centroids 116F, 116G separated or unconnected. As such, the vertical order determination system 100 may generate three road segments—a first road segment 121, a second road segment 131, and a third road segment 141. The vertical order determination system 100 may determine the elevation order of the road segments 121, 131, 141. Thus, the vertical order determination system 100 may determine that the first road segment 121 is above the second road segment 131 based on the arrows 124A, 124B, 124C, 124D, and the third road segment 141 is above the first road segment 121 based on the arrow 134B.

Figure 1D:
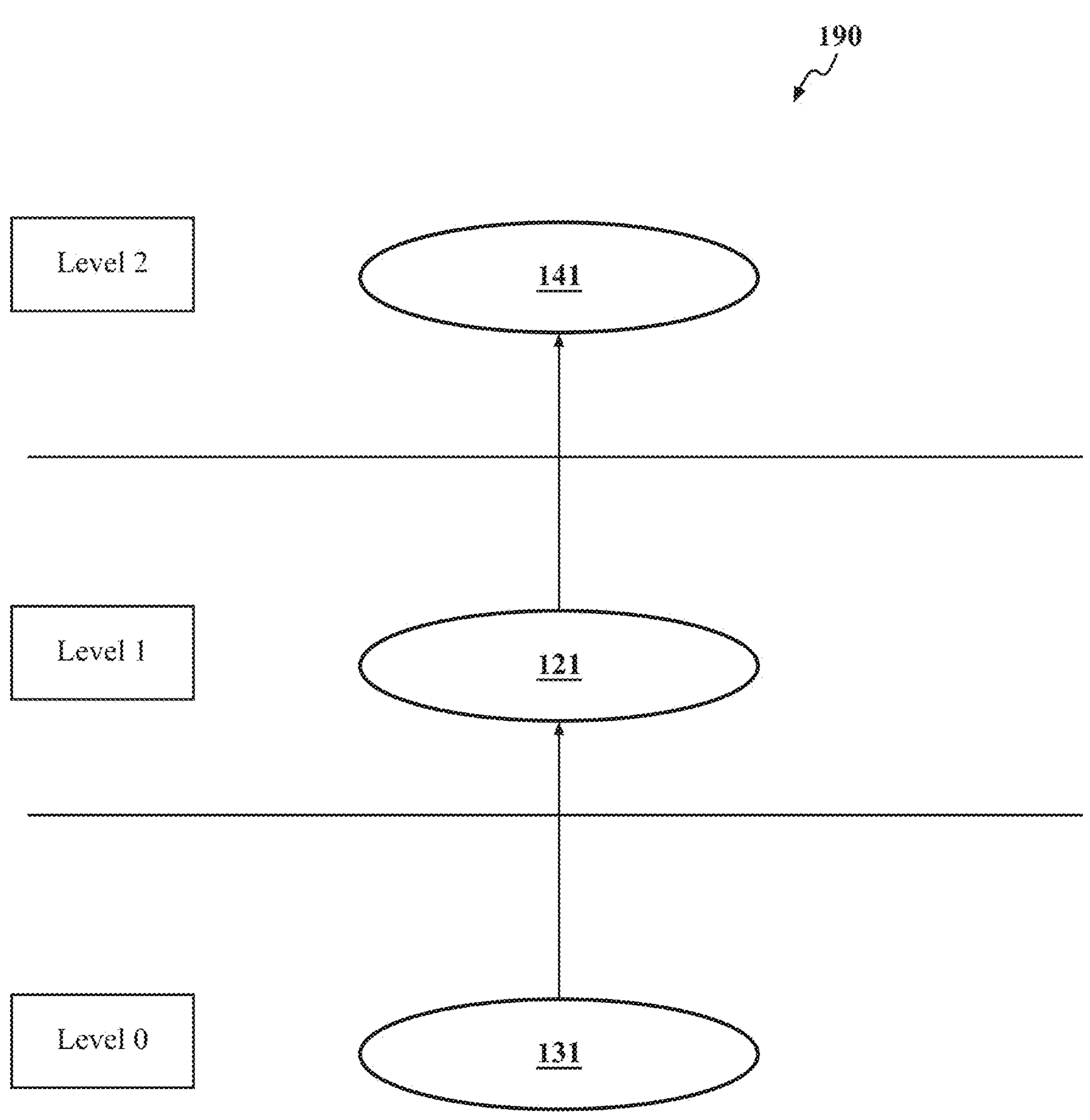

As shown in FIG. 1D, the vertical order determination system 100 generates a vertical order graph 190 based on the layer graph 111. The vertical order graph 190 includes the second road segment 131 at level 0 (the lowest level), the first road segment 121 at level 1, and the third road segment 141 at level 2 (the highest level).

Figure 2A:
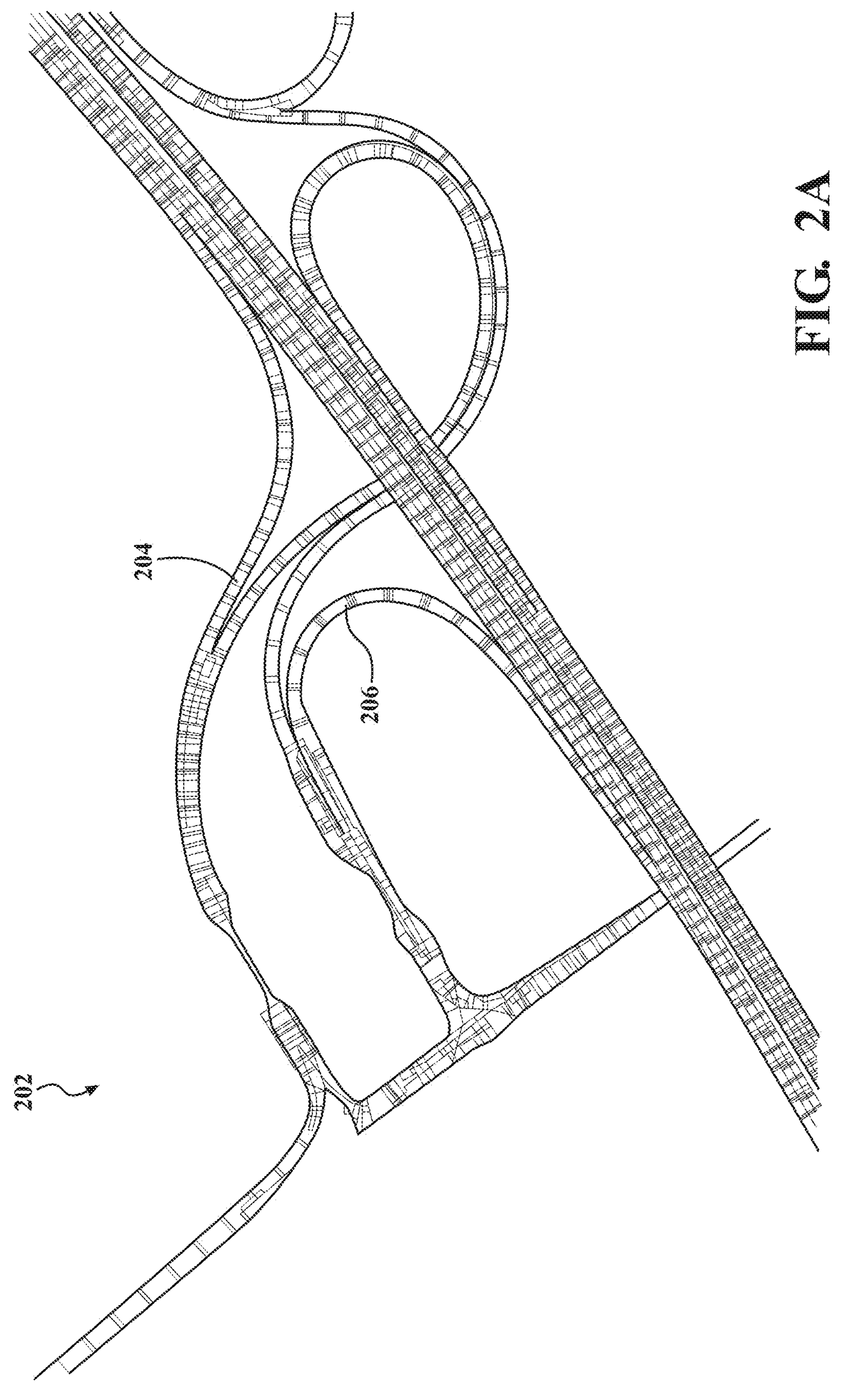
FIGS. 2A-2E illustrate another example of determining a vertical order of overlapping roadways.

FIGS. 2A-2E illustrate another example of determining a vertical order of overlapping roadways. As an example and as shown in FIG. 2A, sensor data 202 may outline the shapes of the roads. One or more vehicles travelling along the roads may collect vehicle sensor data relating to the roadways using one or more vehicle sensors on the vehicle(s). As an example, the vehicle sensor(s) may include camera(s), LiDAR sensors, and radar sensors. The vehicle sensors may capture vehicle sensor data 202 that includes information about the roads within the vehicle sensors' field of view 204. The vehicle sensor data 202 may include location coordinates. As shown, each field of view 204 in the vehicle sensor data 202 may be shaped as a polygon 206 with two of the edges of the polygon 206 aligning with the two edges of the roads. The vehicle sensors may store the vehicle sensor data 202 in any suitable form. As an example, the vehicle sensors may upload the vehicle sensor data 202 to a database. A combination or a series of fields of view 204 from the vehicle sensor data 202 may outline the shapes of the roads as shown in FIG. 2A.

Figure 2B:
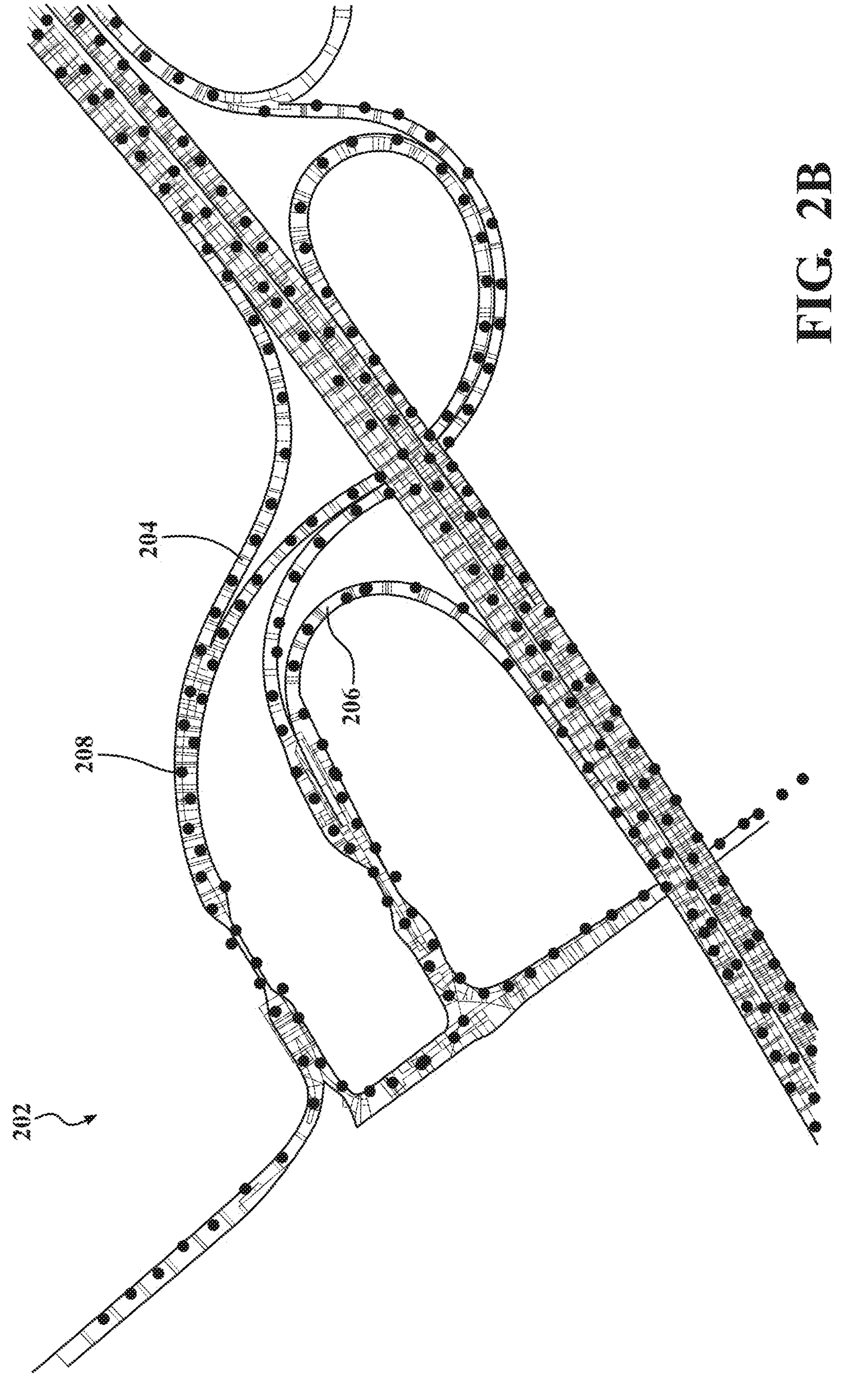

In one or more embodiments and as shown in FIG. 2B, a vertical order determination system 100 may determine the centroid 208 of each of the polygons 206. The vertical order determination system 100 may utilize any suitable method to determine the centroid 208 of each of the polygons 206. As shown in FIG. 2B, the centroids 208 indicate the center of the polygons 206.

Figure 2C:
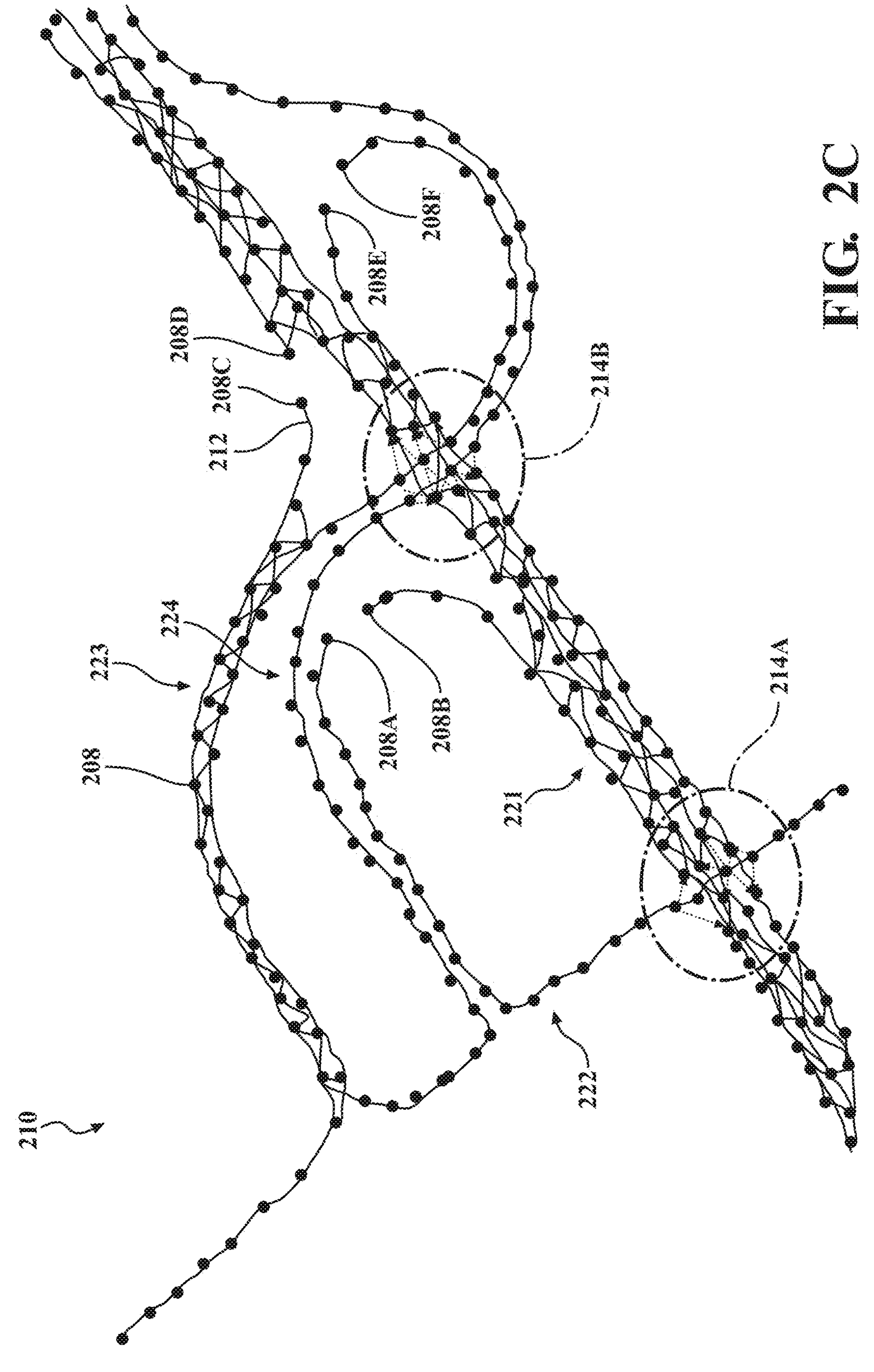

In one or more embodiments and as shown in FIG. 2C, the vertical order determination system 100 may generate a layer graph 210 based on the centroids 208. The layer graph 210 displays one or more partitions of the roads in a region. The vertical order determination system 100 may connect neighboring centroids 208 using an edge 212 based on one or more characteristics of the related sensor data. As an example, the vertical order determination system 100 may connect neighboring centroids 208 based on whether the related sensor data originate from the same vehicle and/or whether the related sensor data share a similar elevation level. In a case where there is a difference in elevation level, the vertical order determination system 100 may connect two centroids 208 based on whether the elevation difference is less than a predetermined threshold value. As an example, in a case where the elevation difference is three feet, the vertical order determination system 100 may connect the neighboring centroids 208 using an edge 212, indicating that a vehicle can drive directly from one of the neighboring centroids 208 to the other of the neighboring centroids 208 along the edge 212. As another example, in a case where the elevation difference is 20 feet, the vertical order determination system 100 may not connect the neighboring centroids 208, indicating that a vehicle cannot drive directly from one of the neighboring centroids 208 to the other of the neighboring centroids 208. The vertical order determination system may not connect neighboring centroids 208 even when the centroids 208 have an elevation difference that is less than the predetermined threshold in a case where there are centroids 208 originating from different vehicles. This may indicate that there is a physical barrier between the centroids 208.

The vertical order determination system 100 may connect each pair of centroids 208 in an order such as starting from the two centroids with the least difference in elevation. The vertical order determination system 100 may start by connecting the two centroids with the least difference in elevation, followed by the next two centroids with the next least difference in elevation amongst the remaining unconnected centroids, and so on. As the vertical order determination system 100 selects the next two centroids 208 to connect based on the least difference in elevation amongst the remaining unconnected centroids, the vertical order determination system 100 determines whether connecting the selected centroids will lead to a self-overlapping partition, either a direct self-overlapping partition or an indirect self-overlapping partition, as previously described.

As shown in FIG. 2C, the vertical order determination system 100 determines to not connect the two centroids 208A, 208B as that would connect two partitions 221, 222 of the road causing a direct self-overlapping partition at a first overlap location 214A. The vertical order determination system 100 determines to not connect the two centroids 208C, 208D, 208E, 208F so as not to create a self-overlapping partition at a second overlap location 214B.

Figure 2D:
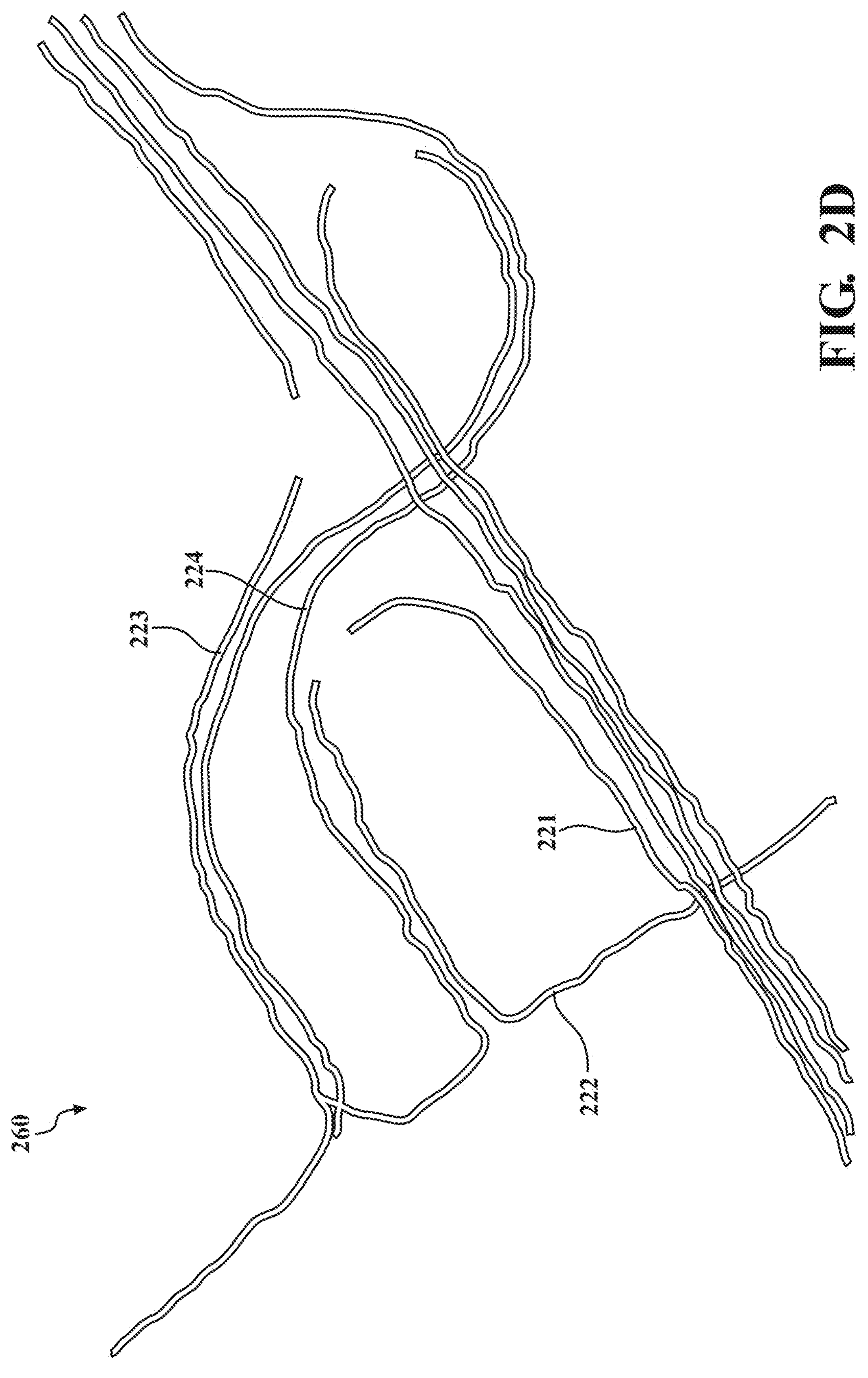

In one or more embodiments and also shown in FIG. 2D, the vertical order determination system 100 generates an elevation graph 260 in which the roads are divided into partitions 221, 222, 223, 224 based on the layer graph 210.

Figure 2E:
Figure 2E:
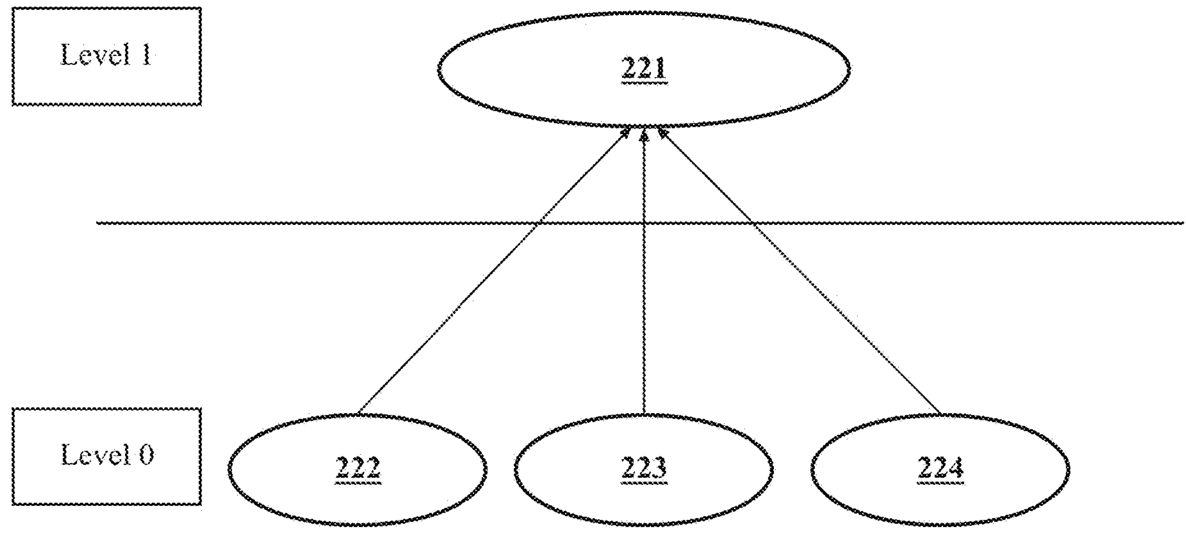

In one or more embodiments and as shown in FIG. 2E, the vertical order determination system 100 may determine an elevation relationship between the road partitions 221, 222, 223, 224. The vertical order determination system 100 may compare the elevation levels for the centroids (or points) 208 associated with each of the partitions 221, 222, 223, 224 and arrange the partitions 221, 222, 223, 224 based on the elevation levels of the centroids associated with the partitions 221, 222, 223, 224. As such, the vertical order determination system 100 may determine a vertical order 270 of the road partitions 221, 222, 223, 224 in the road graph 260 based on at least the elevation relationship. As shown, the partitions 222, 223, 224 are below one partition 221. As such, the vertical order determination system 100 may assign a level 1 to the one partition 221 and a level 0 to the other partitions 222, 223, 224. The vertical order determination system 100 may then assign the points 208 and edges 212 associated with each of the road partitions 221, 222, 223, 224 one of the two levels (i.e., level 0 or level 1) based on the level of the associated road partition 221, 122, 123, 124, 125. The vertical order determination system 100 may then update and output the sensor data 202 including the centroids 208, the edges 212, and the associated levels to any suitable entity.

Figure 3A:
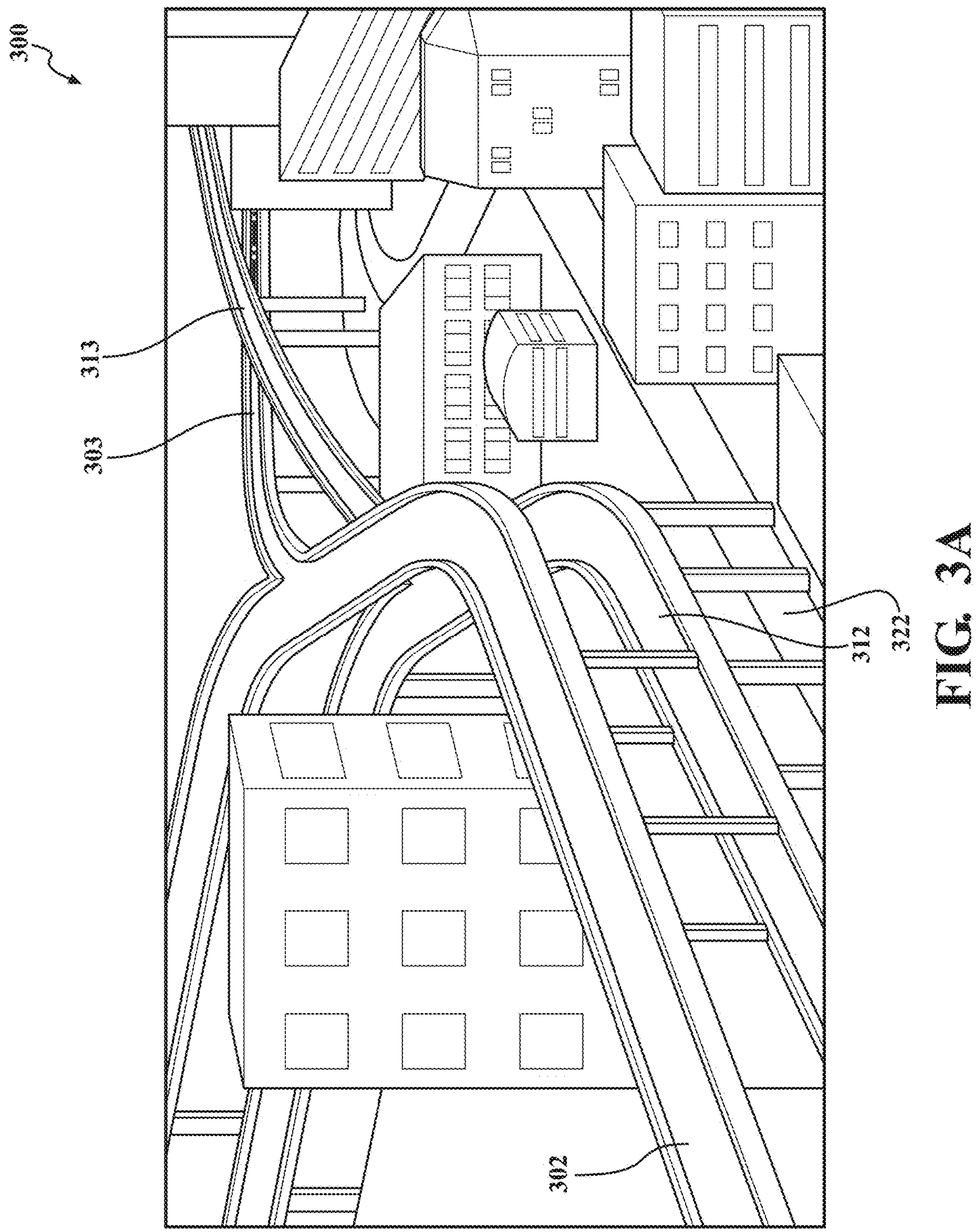
FIGS. 3A-3D illustrate another example of determining a vertical order of overlapping roadways.

FIGS. 3A-3D illustrate another example of determining a vertical order of overlapping roadways. FIG. 3A shows a region 300 with three overlapping roads 302, 312, 322. A length of a first road 302 overlaps a length of a second road 312. A length of the second road 312 overlaps a length of a third road 322. A branch 313 of the second road 312 overlaps a branch 303 of the first road 302.

Figure 3B:
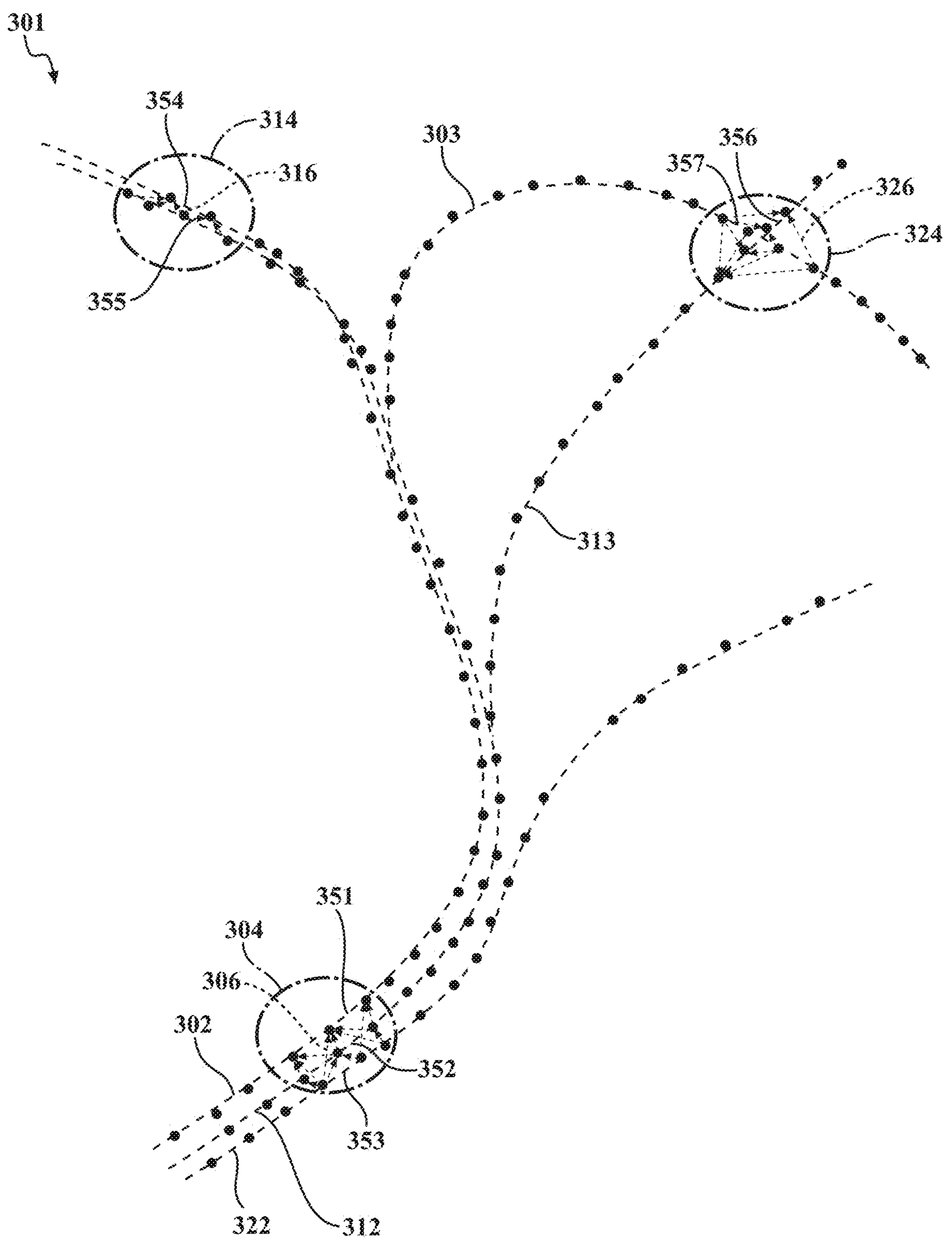

FIG. 3B shows a drivability graph 301 for the three roads 302, 312, 322. Although the roads 302, 312, 322 are on top of each other from a bird's eye view, the drivability graph 301 shows the roads 302, 312, 322 side by side for ease of viewing. At a first location 304, the first road 302 overlaps the second road 312 and the second road 312 overlaps the third road 322. As such and as shown by a first set of arrows 306, a first road segment 351 (a segment of the first road 302) overlaps a second road segment 352 (a segment of the second road 312) and the second road segment 352 overlaps a third road segment 353 (a segment of the third road 322). At a second location 314, the first road 302 overlaps the second road 312. As such and as shown by a second set of arrows 316, a fourth road segment 354 (another segment of the first road 302) overlaps a fifth road segment 355 (another segment of the second road 312). At a third location 324, the branch 313 of the second road 312 overlaps the branch 303 of the first road 302. As such and as shown by a third set of arrows 326, a sixth road segment 356 (a segment of the branch 313) overlaps a seventh road segment 357 (a segment of the branch 303). The vertical order determination system 100 may detect the locations 304, 314, 324 of overlaps and the direction of the arrows 306, 316, 326 using the methods previously disclosed.

Figure 3C:
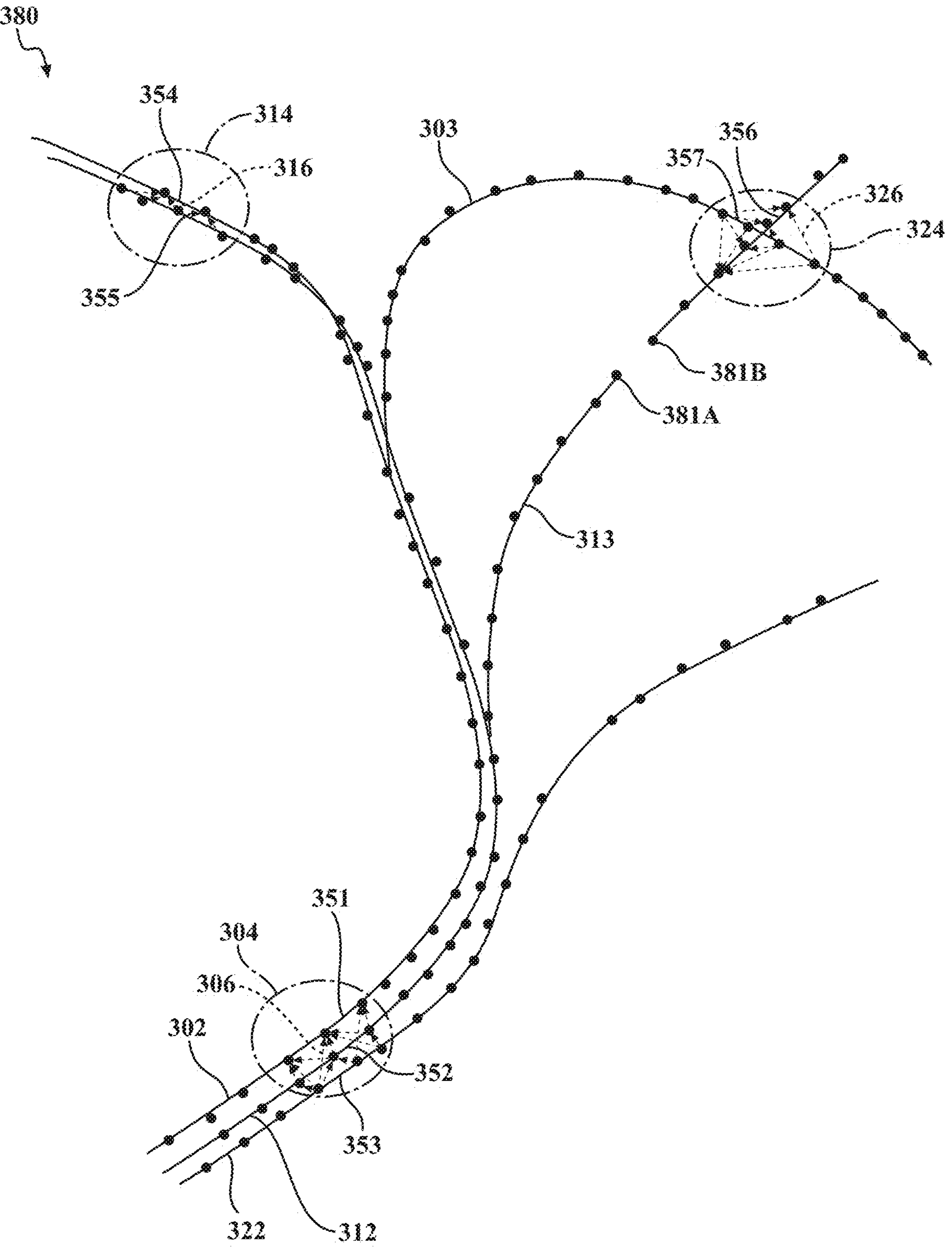

In one or more embodiments and as shown in FIG. 3C, the vertical order determination system 100 generates a layer graph 380. The vertical order determination system 100 connects the neighboring centroids starting from the two neighboring centroids that have the lowest gradient relationship value and based on at least the condition that connecting the two neighboring centroids does not create a self-overlapping polygon directly or indirectly.

The vertical order determination system 100 connects the neighboring centroids until the last two centroids 381A, 381B. The vertical order determination system 100 does not connect the two centroids 381A, 381B as connecting the two centroids 381A, 381B would create an indirect self-overlapping polygon. The indirect self-overlapping polygon would be the first road 302 overlapping the second road 312 at the first location 304 and the second road 312 overlapping the first road 302 at the third location 324. As such, the vertical order determination system 100 maintains a separation between the two centroids 381A, 381A, which keeps the second road 312 separate from a fourth road 356. The layer graph 380 therefore includes four roads 302, 312, 322, 356. While the roads 312, 356 may form a single road and there is a drivable path between the centroids associated with the roads 312, 356, the roads 312, 356 remain separated so as to prevent forming a self-overlapping polygon. The layer graph 380 also includes arrows 306, 316, 326, indicating which road is above and which road is below, or in other words, which road is overlapping or being overlapped by the other road(s).

Figure 3D:
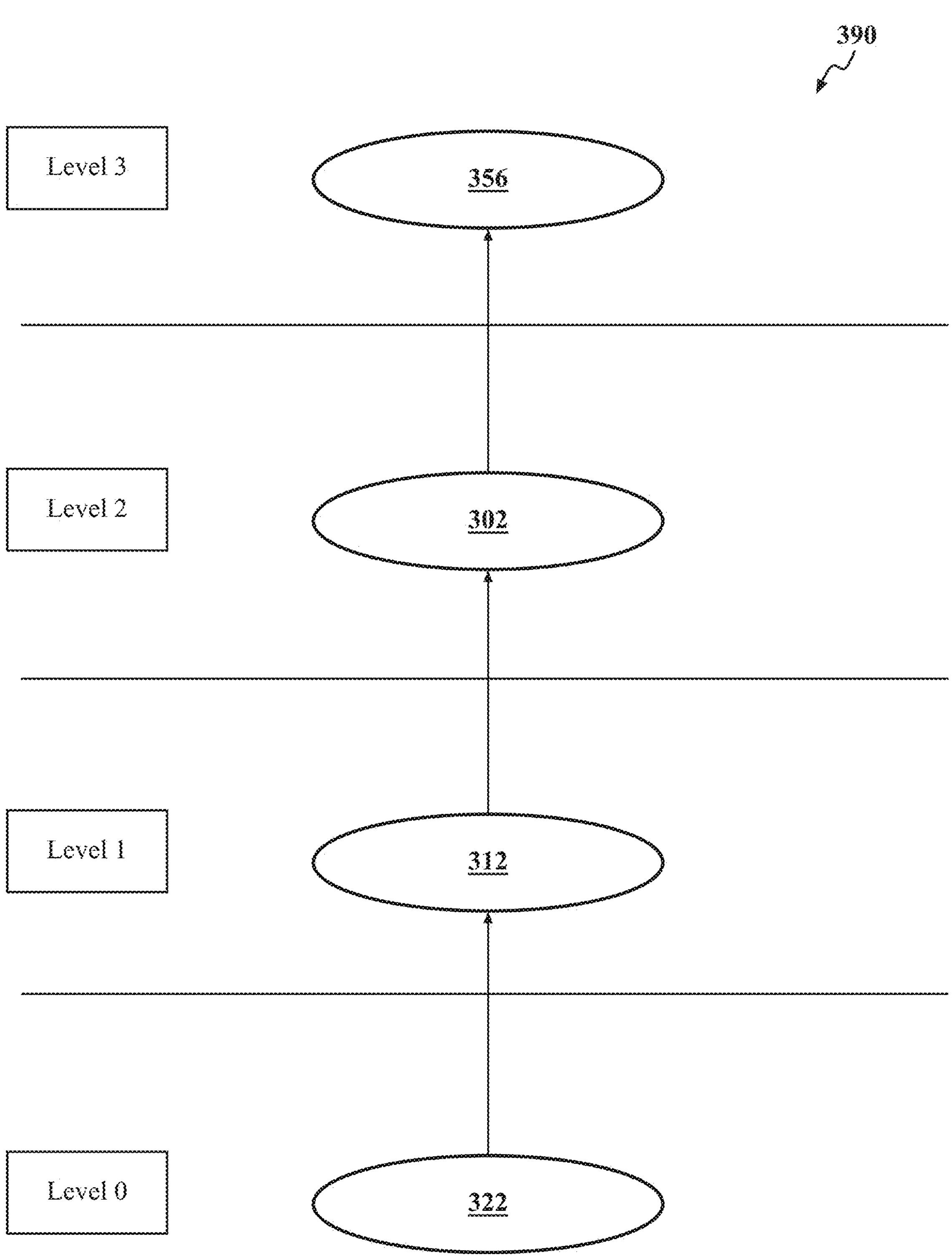

In one or more embodiments and as shown in FIG. 3D, the vertical order determination system 100 generates a vertical order graph 390 based on the layer graph 380. The vertical order graph 390 includes the third road 322 at level 0 (the lowest level), the second road segments 312 at level 1, the first road at level 2, and the fourth road 356 at level 3 (the highest level).

Figure 4:
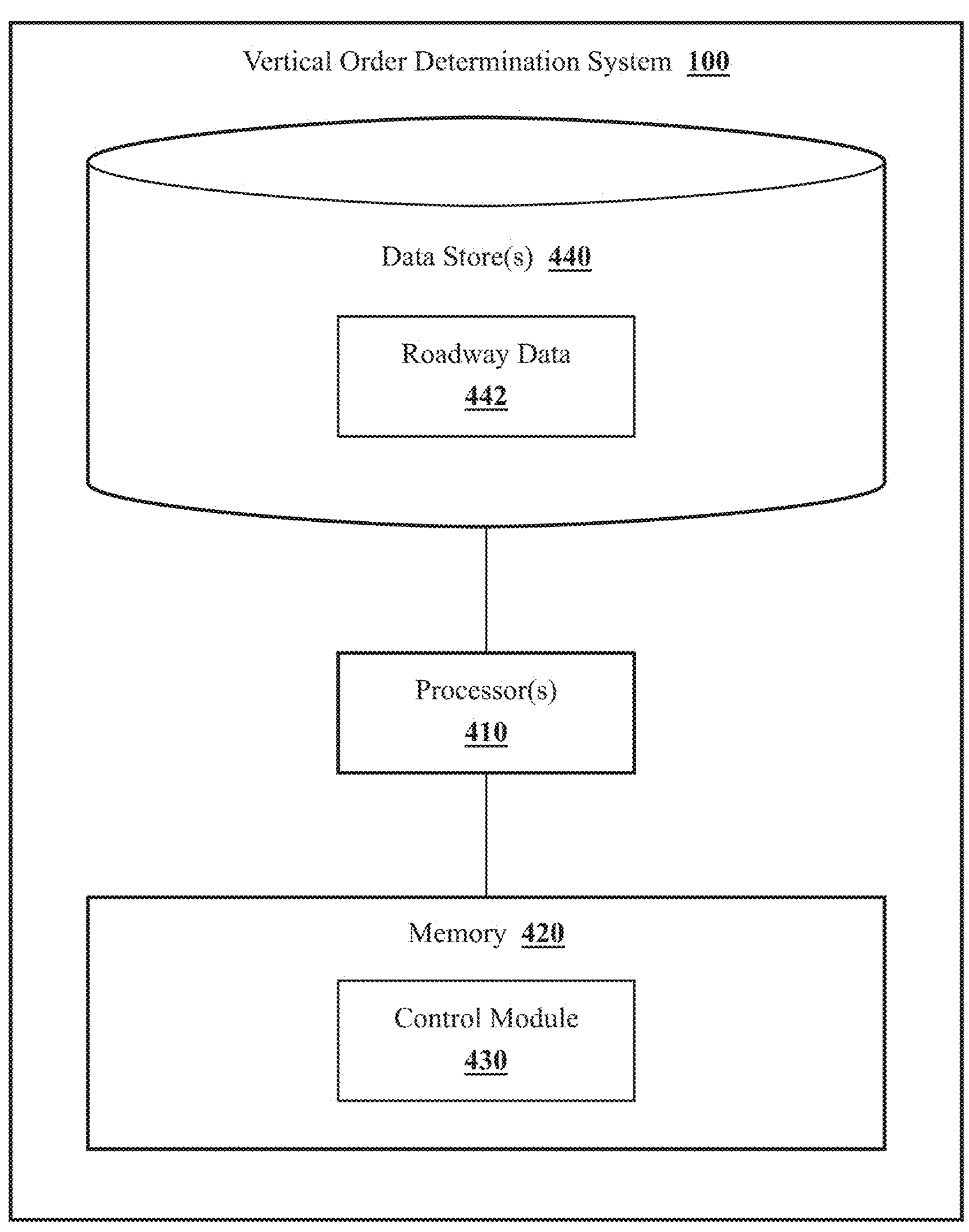
FIG. 4 illustrates one embodiment of the vertical order determination system.

With reference to FIG. 4, one embodiment of the vertical order determination system 100 is illustrated. The vertical order determination system 100 is shown as including a processor 410. Accordingly, the processor 410 may be a part of the vertical order determination system 100, or the vertical order determination system 100 may access the processor 410 through a data bus or another communication path. In one or more embodiments, the processor 410 is an application-specific integrated circuit (ASIC) that is configured to implement functions associated with a control module 430. In general, the processor 410 is an electronic processor, such as a microprocessor, which is capable of performing various functions as described herein.

In one embodiment, the vertical order determination system 100 includes a memory 420 that stores the control module 430 and/or other modules that may function in support of determining the vertical order of overlapping roadways. The memory 420 is a random-access memory (RAM), read-only memory (ROM), a hard disk drive, a flash memory, or another suitable memory for storing the control module 430. The control module 430 is, for example, machine-readable instructions that, when executed by the processor 410, cause the processor 410 to perform the various functions disclosed herein. In further arrangements, the control module 430 is a logic, integrated circuit, or another device for performing the noted functions that includes the instructions integrated therein.

Furthermore, in one embodiment, the vertical order determination system 100 includes a data store 440. The data store 440 is, in one arrangement, an electronic data structure stored in the memory 420 or another data store, and that is configured with routines that can be executed by the processor 410 for analyzing stored data, providing stored data, organizing stored data, and so on. Thus, in one embodiment, the data store 440 stores data used by the control module 430 in executing various functions.

For example, as depicted in FIG. 4, the data store 440 may include roadway data 442 along with, for example, other information that is used and/or produced by the control module 430. The roadway data 442 may include information 108, 128, 129, 160 about one or more roadways and the information may originate from vehicle sensor data 102 and/or sensor data from any suitable roadside or aerial sensors. The roadway data 442 may further include drivability graphs 110 and/or any suitable maps describing the roadways 302, 312, 322.

While the vertical order determination system 100 is illustrated as including the various data elements, it should be appreciated that one or more of the illustrated data elements may not be included within the data store 440 in various implementations and may be included in a data store that is external to the vertical order determination system 100. In any case, the vertical order determination system 100 stores various data elements in the data store 440 to support functions of the control module 430.

In one embodiment, the control module 430 includes instructions that, when executed by the processor(s) 410, cause the processor(s) 410 to receive roadway data 442. As previously mentioned, roadway data 442 may include information about one or more roadways 102, 112 in the area of interest. The roadway data 442 may include sensor data, vehicle sensor data, maps, and/or drivability graphs. In one or more arrangements, the control module 430 may receive roadway data 442 and determine drivability graphs based on the roadway data 442. As an example, the roadway data 442 may include sensor data that discloses a trajectory of travel of one or more vehicles. The control module 430 may extract a drivability graph from the sensor data as disclosed above. In one or more arrangements, the control module 430 may receive drivability graphs that show the trajectory of travel of one or more vehicles using centroids. The centroids identify the positions of the vehicle along the roadway 302, 312, 322. The drivability graphs may include information relating to elevation levels of the centroids and the elevation difference between the centroids, or more specifically, neighboring centroids.

In one embodiment, the control module 430 includes instructions that, when executed by the processor(s) 410, cause the processor(s) 410 to generate connections between centroids based on at least an elevation difference, proximity, and forming a non-self-overlapping polygon. As previously mentioned, the centroids are vehicle positions along one or more roads. The centroids may originate from a drivability graph and/or vehicle sensor data. Each centroid has an elevation level, which may be as an example, the distance between the location of the centroid and a fixed ground level (or sea level).

In one or more arrangements, the control module may generate the connections between centroids in an order starting from two centroids with a lowest elevation difference. As such, the control module 430 selects two centroids based on the elevation difference between the two centroids being the lowest of the centroids, and the control module connects the two centroids using an edge. The control module 430 continues to select two centroids with the next lowest elevation difference of the remaining centroids and then connects the two centroids. The control module selects the centroids based on the centroids being neighbors and/or proximate to each other. The control module 430 also determines whether connecting the two centroids would form a self-overlapping polygon. The control module connects the two centroids in a case where connecting the two centroids forms a non-self-overlapping polygon. The non-self-overlapping polygon has sides that match at least a portion of the one or more roads and the sides do not overlap. As such, the non-self-overlapping polygon may have sides that line up with one road. Alternatively and additionally, the non-self-overlapping polygon may have sides that line up with multiple roads.

In general, the control module 430 connects each pair of centroids that have an elevation difference that is below a threshold value and where connecting the pair of centroids forms a non-self-overlapping polygon. The control module 430 may connect the pairs of centroids starting from the pair of centroids with the lowest elevation difference until the elevation difference is at the threshold value and/or the connecting of the pair of centroids would form a self-overlapping polygon. The threshold value may be the difference between the surface of two overlapping roads. As an example, the threshold value may be fourteen (14) feet. The control module 430 may not connect any neighboring centroids that have an elevation difference of fourteen feet or more. The control module may generate an arrow originating from the centroid at the lower elevation level and ending at the centroid at the higher elevation level.

In one embodiment, the control module 430 includes instructions that, when executed by the processor(s) 410, cause the processor(s) 410 to determine a vertical order of the one or more roads based on at least the non-self-overlapping polygon and an indicator indicating an elevation of the non-self-overlapping polygon. The control module 430 may determine the vertical order of the one or more roads associated with the non-self-overlapping polygon based on the elevation levels of the centroids associated with the non-self-overlapping polygon. The indicator indicating the elevation of the non-self-overlapping polygon may be within the sensor data of the centroids associated with the non-self-overlapping polygon.

In one or more arrangements, a second non-self-overlapping polygon may have sides that match a second portion of the one or more roads. In other words, the one or more roads may be partitioned into multiple non-self-overlapping polygons. As such, the control module 430 may determine the vertical order relationship between the multiple non-self-overlapping polygons. In such an arrangement, the control module 430 may determine the vertical order of the one or more roads based on at least the second non-self-overlapping polygon and the indicator indicating an elevation difference between the non-self-overlapping polygon and the second non-self-overlapping polygon. In other words, the control module 430 may compare the elevation levels of centroids for the non-self-overlapping polygon to the elevation levels of centroids for the second non-self-overlapping polygon at location. The control module 430 selects the centroids for the comparison based on the proximity of the centroids. As such, the centroids may be located at a position where the two non-self-overlapping polygons overlap. As an example, the control module 430 may generate arrows showing the centroid that is at a lower elevation level and the centroid that is at a higher elevation level.

In one embodiment, the control module 430 includes instructions that, when executed by the processor(s) 410, cause the processor(s) 410 to determine a vertical order of the one or more roads based on at least the non-self-overlapping polygon and an indicator indicating an elevation of the non-self-overlapping polygon. The control module 430 may arrange the one or more roads associated with the non-self-overlapping in a vertical order based on the roads and the indicator (such as an arrow) that indicates which portion of the roads is above or below another portion of the roads. The control module 430 may assign each portion of the roads a level and may further assign each level in the vertical order 270 a value. As an example, the control module 430 may assign the portion of the roads at a lower level, level 0 and the portion of the road at a higher level, level 1. In one or more arrangements where there are multiple non-self-overlapping polygons, the control module may determine the elevation relationship (or the vertical order) between the portions of the roads associated with each of the multiple non-self-overlapping polygons, and then determine the elevation relationship (or vertical order) between the multiple non-self-overlapping polygons.

Upon generating the vertical order for the portions of the road, the control module 430 may then output the vertical order to any suitable entity such as a map database or a traffic database. Additionally and/or alternatively, the control module 430 may generate an electronic map based on the vertical order of the one or more roads, and the electronic map may be at least partially disposed of in one or more systems of a vehicle. As an example, the electronic map be in the navigation system.

Figure 5:
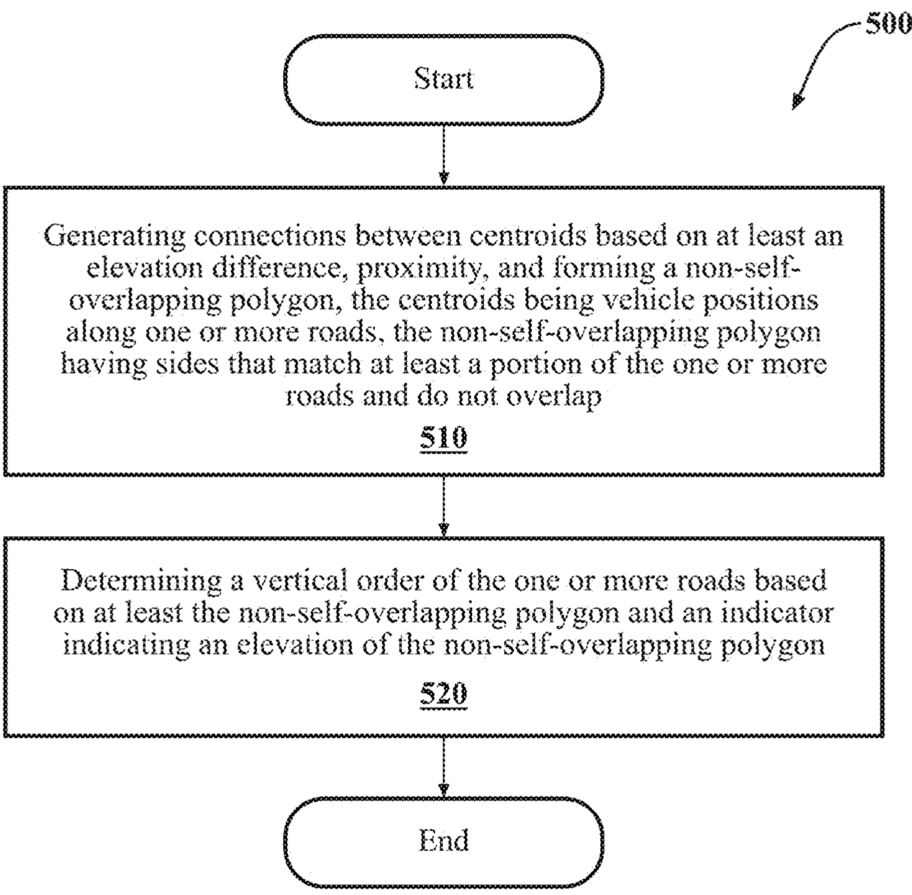
FIG. 5 is a flowchart illustrating one embodiment of a method associated with determining a vertical order of overlapping roadways.

FIG. 5 is a flowchart illustrating one embodiment of a method 500 associated with determining the vertical order 290 of overlapping roadways 221, 231, 241. The method

500 will be described from the viewpoint of the vertical order determination system 100. However, the method 500 may be adapted to be executed in any one of several different situations and not necessarily by the vertical order determination system 100.

At step 510, the control module 430 may cause the processor(s) 410 to generate connections between centroids based on at least an elevation difference, proximity, and forming a non-self-overlapping polygon. As previously mentioned, the centroids are vehicle positions along one or more roads. The centroids may originate from a drivability graph and/or vehicle sensor data. The non-self-overlapping polygon has sides that match at least a portion of the one or more roads and do not overlap.

The control module 430 may generate the connections between centroids in an order starting from two centroids with a lowest elevation difference as previously disclosed. The control module 430 may continually connect centroids so as to form one or more non-self-overlapping polygons that match one or more portions of the one or more roads.

At step 520, the control module 430 may cause the processor(s) 410 to determine a vertical order of the one or more roads based on at least the non-self-overlapping polygon and an indicator indicating an elevation of the non-self-overlapping polygon. The control module 430 may then arrange the portions of the roads associated with one or more non-self-overlapping polygons in a vertical order based on the elevation levels of the centroids associated with the portions of the roads. The control module 430 may then output the vertical order 390 to an entity such as a third-party service or database. Additionally and/or alternatively, the control module may generate an electronic map based on the vertical order of the one or more roads. As an example, the electronic map may be at least partially disposed of in one or more systems of a vehicle such as the navigation system.

FIG. 6 is another flowchart illustrating one embodiment of a method 600 associated with determining the vertical order 290 of overlapping roadways 102, 112. The method 600 will be described from the viewpoint of the vertical order determination system 100. However, the method 600 may be adapted to be executed in any one of several different situations and not necessarily by the vertical order determination system 100.

At step 610, the control module 430 may cause the processor(s) 410 to generate a layer graph 111. The layer graph 111 includes drivability graph edges 131A, 131B, 131C, 131D, 131E, 131F, 131G, 131H, 131J, 131K and the separation graph edges 124A, 124B, 124C, 124D, 134A, 134B. The control module 430 initially marks the drivability graph edges 131A, 131B, 131C, 131D, 131E, 131F, 131G, 131H, 131J, 131K as not processed.

At step 620, the control module 430 may cause the processor(s) 410 to determine (or identify) a drivability graph edge 131A, 131B, 131C, 131D, 131E, 131F, 131G, 131H, 131J, 131K with the lowest absolute gradient of all drivability graph edges 131A, 131B, 131C, 131D, 131E, 131F, 131G, 131H, 131J, 131K that have not been marked as processed.

At step 630, the control module 430 may cause the processor(s) 410 to determine whether to keep the drivability graph edge 131A, 131B, 131C, 131D, 131E, 131F, 131G, 131H, 131J, 131K in the layer graph 111 based on whether the drivability graph edge 131A, 131B, 131C, 131D, 131E, 131F, 131G, 131H, 131J, 131K creates a cycle in the layer graph 111 that involves separation graph edges 124A, 124B, 124C, 124D, 134A, 134B. The cycle may indicate that a path 102, 112 overlaps onto itself or two paths 102, 112 that are vertically intertwined. The control module 430 may not add or keep the drivability graph edge 131A in a case where the cycle indicates that the path 102, 112 overlaps onto itself or two paths 102, 112 are intertwined.

At step 640, the control module 430 may cause the processor(s) 410 to mark the drivability graph edge 131A, 131B, 131C, 131D, 131E, 131F, 131G, 131H, 131J, 131K as processed.

At step 650, the control module 430 may cause the processor(s) 410 to determine whether there are any remaining drivability graph edges 131A, 131B, 131C, 131D, 131E, 131F, 131G, 131H, 131J, 131K that have not been marked as processed. In a case where the control module 430 causes the processor(s) 410 to determine that there are drivability graph edges 131A, 131B, 131C, 131D, 131E, 131F, 131G, 131H, 131J, 131K that have not been marked as processed, the control module 430 may then cause the processor(s) 410 to proceed to step 620. In a case where the control module 430 causes the processor(s) 410 to determine that there are no drivability graph edges 131A, 131B, 131C, 131D, 131E, 131F, 131G, 131H, 131J, 131K that have not been marked as processed, the control module 430 may then cause the processor(s) 410 to proceed to step 620.

At step 660, the control module 430 may cause the processor(s) 410 to determine the vertical ordering of layers in the layer graph 111 based on the layers 121, 131, 141 and separation graph edges 134 within the layer graph 111.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:

a processor; and a memory storing machine-readable instructions that, when executed by the processor, cause the processor to:

generate connections between centroids based on at least an elevation difference, proximity, and whether connecting the centroids would form a self-overlapping polygon;

keep centroids that would result in a self-overlapping polygon unconnected;

form a non-self-overlapping polygon based on the connections, the centroids being vehicle positions along one or more roads, the non-self-overlapping polygon having sides that match at least a portion of the one or more roads and do not overlap; and determine a vertical order of the one or more roads based on at least the non-self-overlapping polygon and an indicator indicating an elevation of the non-self-overlapping polygon.

2. The system of claim 1, wherein the centroids originate from a drivability graph.

3. The system of claim 1, wherein the centroids originate from vehicle sensor data.

4. The system of claim 1, wherein the machine-readable instructions further include instructions that when executed by the processor cause the processor to:

output the vertical order to an entity.

5. The system of claim 1, wherein the machine-readable instructions further include instructions that when executed by the processor cause the processor to:

generate the connections between centroids in an order starting from two centroids with a lowest elevation difference.

6. The system of claim 1, wherein a second non-self-overlapping polygon has sides that match a second portion of the one or more roads, and wherein the machine-readable instructions further include instructions that when executed by the processor cause the processor to:

determine the vertical order of the one or more roads based on at least the second non-self-overlapping polygon and the indicator indicating an elevation difference between the non-self-overlapping polygon and the second non-self-overlapping polygon.

7. The system of claim 1, wherein the machine-readable instructions further include instructions that when executed by the processor cause the processor to:

generate an electronic map based on the vertical order of the one or more roads, wherein the electronic map is at least partially disposed of in one or more systems of a vehicle.

8. A method comprising:

generating connections between centroids based on at least an elevation difference, proximity, and whether connecting the centroids would form a self-overlapping polygon;

keeping centroids that would result in a self-overlapping polygon unconnected;

forming a non-self-overlapping polygon based on the connections, the centroids being vehicle positions along one or more roads, the non-self-overlapping polygon having sides that match at least a portion of the one or more roads and do not overlap; and determining a vertical order of the one or more roads based on at least the non-self-overlapping polygon and an indicator indicating an elevation of the non-self-overlapping polygon.

9. The method of claim 8, wherein the centroids originate from a drivability graph.

10. The method of claim 8, wherein the centroids originate from vehicle sensor data.

11. The method of claim 8, further comprising:

outputting the vertical order to an entity.

12. The method of claim 8, further comprising:

generating the connections between centroids in an order starting from two centroids with a lowest elevation difference.

13. The method of claim 8, wherein a second non-self-overlapping polygon has sides that match a second portion of the one or more roads, and further comprising:

determining the vertical order of the one or more roads based on at least the second non-self-overlapping polygon and the indicator indicating an elevation difference between the non-self-overlapping polygon and the second non-self-overlapping polygon.

14. The method of claim 8, further comprising:

generating an electronic map based on the vertical order of the one or more roads, wherein the electronic map is at least partially disposed of in one or more systems of a vehicle.

15. A non-transitory computer-readable medium including instructions that when executed by a processor cause the processor to:

generate connections between centroids based on at least an elevation difference, proximity, and whether connecting the centroids would form a self-overlapping polygon;

keep centroids that would result in a self-overlapping polygon unconnected;

form a non-self-overlapping polygon based on the connections, the centroids being vehicle positions along one or more roads, the non-self-overlapping polygon having sides that match at least a portion of the one or more roads and do not overlap; and determine a vertical order of the one or more roads based on at least the non-self-overlapping polygon and an indicator indicating an elevation of the non-self-overlapping polygon.

16. The non-transitory computer-readable medium of claim 15, wherein the centroids originate from a drivability graph.

17. The non-transitory computer-readable medium of claim 15, wherein the centroids originate from vehicle sensor data.

18. The non-transitory computer-readable medium of claim 15, wherein the instructions further include instructions that when executed by the processor cause the processor to:

output the vertical order to an entity.

19. The non-transitory computer-readable medium of claim 15, wherein the instructions further include instructions that when executed by the processor cause the processor to:

generate the connections between centroids in an order starting from two centroids with a lowest elevation difference.

20. The non-transitory computer-readable medium of claim 15, wherein a second non-self-overlapping polygon has sides that match a second portion of the one or more roads, and wherein the instructions further include instructions that when executed by the processor cause the processor to:

determine the vertical order of the one or more roads based on at least the second non-self-overlapping polygon and the indicator indicating an elevation difference between the non-self-overlapping polygon and the second non-self-overlapping polygon.

* * * * *